United States Patent [19]

Meckler

[11] Patent Number: 4,739,624
[45] Date of Patent: Apr. 26, 1988

[54] MULTI-ZONE THERMAL ENERGY STORAGE VARIABLE AIR VOLUME HYDRONIC HEAT PUMP SYSTEM

[76] Inventor: Milton Meckler, 16348 Tupper St., Sepulveda, Calif. 91343

[21] Appl. No.: 16,922

[22] Filed: Feb. 20, 1987

[51] Int. Cl.$^4$ ............................................. F25B 13/00
[52] U.S. Cl. ...................................... 62/160; 62/183; 62/238.6; 62/238.7; 62/324.1
[58] Field of Search ................ 62/238.6, 238.7, 160, 62/324.1, 98, 183; 237/2 B, 1 A; 165/2, 18, 62

[56] References Cited

U.S. PATENT DOCUMENTS

| | | | |
|---|---|---|---|
| 3,996,759 | 12/1976 | Meckler | 62/238.6 X |
| 4,165,036 | 8/1979 | Meckler | 62/238.6 X |
| 4,419,864 | 12/1983 | McFarlan | 62/98 |
| 4,559,788 | 12/1985 | McFarlan | 62/238.6 X |

*Primary Examiner*—Lloyd L. King
*Attorney, Agent, or Firm*—William H. Maxwell

[57] ABSTRACT

A multi-zone thermal energy storage variable air volume heat pump system for capacity effective averaging of continuously operable heat pumps of varied capacity and each operable at its optimum capacity and assigned to a separate zone space, wherein variable air volume by-pass ducts and zone space dampers operate in response to zone space temperature, and characterized by a chilled water storage tank and pump circulating chilled water through one closed circuit, and a hot water storage tank and pump circulating hot water through another closed circuit and through a water conditioning coil, there being a downstream charging coil and a re-cooling coil in the supply air duct upstream from the air conditioning coil and each selectively in closed circuit through the chilled water storage tank, and the re-cooling coil selectively in closed circuit through the hot water storage tank, and control means therefor.

14 Claims, 3 Drawing Sheets

MULTI-ZONE THERMAL ENERGY STORAGE VARIABLE AIR VOLUME HYDRONIC HEAT PUMP SYSTEM

Reference is made to co-pending application Ser. No. 7/058,408 filed June 5, 1987, entitled MULTI-ZONE COLD STORAGE VARIABLE AIR VOLUME AIR CONDITIONING SYSTEM.

BACKGROUND OF THE INVENTION

This invention relates to heat pump air conditioning involving a multiplicity of zones to be conditioned on a scheduled basis or continuing basis as may be required. Heretofore, full capacity heat pumps have been employed for this purpose, their capacity being determined according to the zone space that is to be conditioned, and without regard to the shut-down time that is to be expected. When central air conditioning systems are employed the total of the zone space requirements must be considered and conditioning equipment adequate for the whole is normally provided, again without regard to the shut-down time which inherently occurs as conditioning requirements vary from zone to zone, and from time to time. Therefore, full capacity equipment for multi zone air conditioning has not been altogether cost effective, because the full capacity equipment cannot be operated to full capacity on a full time basis. Accordingly, it is a general object of this invention to provide a Multi-Zone Variable Air Volume Hydronic Heat Pump System for air conditioning in which capacity effective averaging is employed in the selection of heat pump capacities and in which the heat pumps are operated on a full time schedule with their outputs used and/or stored as excess energy for subsequent use in the air conditioning process.

It is an object of this invention to advantageously employ a multiplicity of heat pumps of the same or varied capacities, all selected on a capacity effective basis. In accordance with this invention, a capacity effective averaging basis is the energy required to operate during a scheduled period, usually for a full day; for either air conditioned cooling or air conditioned heating. A feature of this invention is the banking of excess energy acquired by operation of the multiplicity of heat pumps on a full time schedule. In practice, that schedule may be a full twenty four hour day, or preferably a lesser period in order to provide air conditioning during occupancy of the zones involved. For example, an office building occupied only during business hours need not be air conditioned throughout the off-time hours; taking into account a preconditioning period that may be desired etc. Also conditioning requirements will vary according to season, and all of which can be adjusted for in the operation of this system.

It is an object of this invention to absorb and store excess energy, both in the form of heat and cold, from conditioned air produced by the multiplicity of heat pumps and not required at the time for zone conditioning. For example, there will be times when zone conditioning requirements are reduced, or do not exist at all. In practice, there is both hot water and chilled water storage, from which the chilled condition fluid can be drawn and used for subsequent air conditioning. Each, the hot and the chilled water-energy storage means, is a closed circuit with its control and pump means with make-up means and a compression tank. Excess heat is dissipated by a cooling tower, while insufficient heat is supplemented by a water heater or boilder.

It is an object of this invention to provide a control means whereby variable air volume flow restriction causes operation of either of the aforementioned hot water or chilled water storage means. With this invention, a flow sensor (pressure) at the air supply or inlet of the heat pump determines operation of either the hot water or chilled water storage means.

It is an object of this invention to provide a by-pass for the heat pump air circulation and control means therefor whereby the heat pump operates at full capacity at all times, when the systen is in operation, with all or a portion of its conditioned air delivered to the zone space, and alternately with all or a portion of its conditioned air by-passed for conservation of energy by the aforesaid hot water or chilled water storage means.

A widely used system for the control of supply air to the zone space being conditioned is the Variable-Air-Volume (VAV) system, wherein a by-pass with a pressure responsive damper recirculates conditioned air that is restricted by zone space dampers. Aside from the aforementioned improvements in the conservation of energy by banking conditioned liquid, there is the problem of air quality which arises when employing VAV systems. That is, as and when the zone space dampers are modulated down (toward closed), the usual filtration through the return air duct becomes less effective, since the return air volume decreases, there being no air quality change through the recirculation duct. Consequently, the reduced volume of supply air is inadequately filtered and permits the quality of zone space air to deteriorate. Accordingly, it is an object of this invention to provide super-filtration of recirculation air in the Variable-Air-Volume (VAV) system, whereby the reduced discharge of supply air adequately improves the air quality of the zone space air, as and when the zone space dampers modulate. Air quality improvement then becomes inherent. With the present invention, there are primary and secondary air filters; a primary air filter in the return air duct, and a secondary air filter in the recirculation VAV duct. Initial one time filtration occurs through the primary filter, while repeated, partial or additional filtration occurs through the secondary filter. A higher quality filtration is thereby attained, super-filtration, for restricted discharge at reduced volume as supply air by the zone space dampers.

SUMMARY OF THE INVENTION

The zones to be serviced can vary in space volume and the heat pump capacities will vary accordingly. That is, one heat pump can be of greater capacity than another, and each operable on an individual basis. There is no limit to the number of space zones to be put into or taken out of operation, however, when a space zone is put into service it is operated on a full time schedule; it being understood that schedule requirements will also vary as circumstances require.

Each space zone heat pump involves a refrigerant compressor with a reversing valve directing the refrigerant in alternate directions through an air conditioning coil and a water conditioning coil. In the cooling mode the air conditioning coil is the evaporator and the water conditioning coil is the condenser, whereas in the heating mode the air conditioning coil is the condenser and the water conditioning coil is the evaporator. Return or intake air is from the zone space, there being a blower means that circulates the air through the air conditioning coils and to a supply air duct thermostatically controlled discharge by variable air valves or zone dampers. The water conditioning coil is a heat transfer device that either chills or heats the water circulated therethrough.

There are two separate closed circuit water storage means, one for chilled water and one for hot water, there being valve controlled pumping means circulating the chilled water storage through a charging or a re-cooling coil in the conditioned air flow in the cooling mode; and there being a valve controlled pumping means circulating the hot water storage through the water conditioning coil of the heat pump in the cooling or heating modes.

It will be observed that chilled and hot water are available at all times during the continuous operation of the heat pumps, and that any portion thereof not needed in the conditioning of zone space air is excess that can be and is transfered to storage in accordance with this invention. Alternately, the chilled water can then be and is retrieved for subsequent air conditioning, by recirculating it through re-cooling coils in the blower circulated air, either alone or simultanesouly with operation of the heat pump refrigeration.

It is conventional practice to employ an air filter at the supply air intake, which is done here. However, in addition thereto there is also provided an air filter in the by-pass of conditioned air in the unloading function that releases the continuous running heat pump, when zone space air circulation is restricted or shut down partially or completely. This feature enhances air purity efficiently since it occurs in the damped air flow of the by-pass.

This system uses reduced energy while lowering peak demand through shifting required electrical energy consumption to lower cost, daily off-peak and mid-peak rates. Lower installed heat pump capacities is a major benfit, which is accomplished by pre-cooling return air from the zone space, a process that also allows the heat pump to operate at a higher coefficient of performance (COP) in addition to increase COP benefits from continuous verses cyclic compressor operation, thereby contributing to further energy savings.

Re-cooling and storage charging water coils upstream and downstream of each heat pump coil (evaporator-condensor) are served from a non-insulated, piping system extending to a common chilled water storage tank which is maintained at from 61° to 68° F. As a result, though each unit operates continuously during the building cooling periods, its compressor is significantly down sized without sacrificing overall unit capacity. This follows, since the chilled water generated and stored by the heat pump at a time of lower zone space demand is supplied to the upstream pre-cooling coil on demand. This is accomplished by sensibly pre-cooling the warmer (i.e. 78° to 80° F.) return air so that the down sized compressor is automatically assisted in meeting its peak zone space demand at the maximum co-incident space cooling load.

A feature of this system is its ability to maintain humidity control independently of the elevated (i.e. 61° to 68° F.) chilled water temperatures circulated to the re-cooling coils. By operating at these temperatures reduced stored chilled water volume is a result. The uncoupling of sensible and latent cooling coil requirements is made possible by operating the heat pump direct expansion cooling coil continuously for latent load control, while the re-cooling coil operates directly in response to any net space demands for any additional sensible cooling. Since the heat pump compressors are down sized, the associated electrical distribution costs are also reduced. This together with lower maintenance cost, results in significantly reduced operating costs, lower utility demand charges, and attractive utility load management incentives. Further, both the mechanical and electrical construction trades benefit from a significantly lower first cost of installation.

Another feature is the low cost variable-air-temperature (VAT) features that permits close control of individual zone spaces served from the same heat pump. This feature permits superior operation as compared with higher cost centralized Variable-Air-Volume (VAV) or dual duct systems, and without the annoying terminal part load noise variation characteristics of such centrally distributed air handling systems. And, by banking the excess cooling capacity of the multiplicity of heat pumps combined in this composite system operating under light load, and passing excess to the chilled water storage tank, actual installed refrigeration cooling capacity is substantially reduced yet automatically shared with other heat pumps at the peak cooling time returned for later use in meeting individual heat pump zone space cooling demands, while delivering high system comfort performance, standards at affordable cost. In addition, should any one heat pump unit compressor fail, at least some cooling effect to zone space is assured through the operation of that unit's re-cooling coil, as will be described.

The foregoing and various other objects and features of this invention will be apparent and fully understood from the following detailed description of the typical preferred forms and applications thereof, throughout which description reference is made to the accompanying drawings.

THE DRAWINGS

PREFERRED EMBODIMENT

Figure 1:
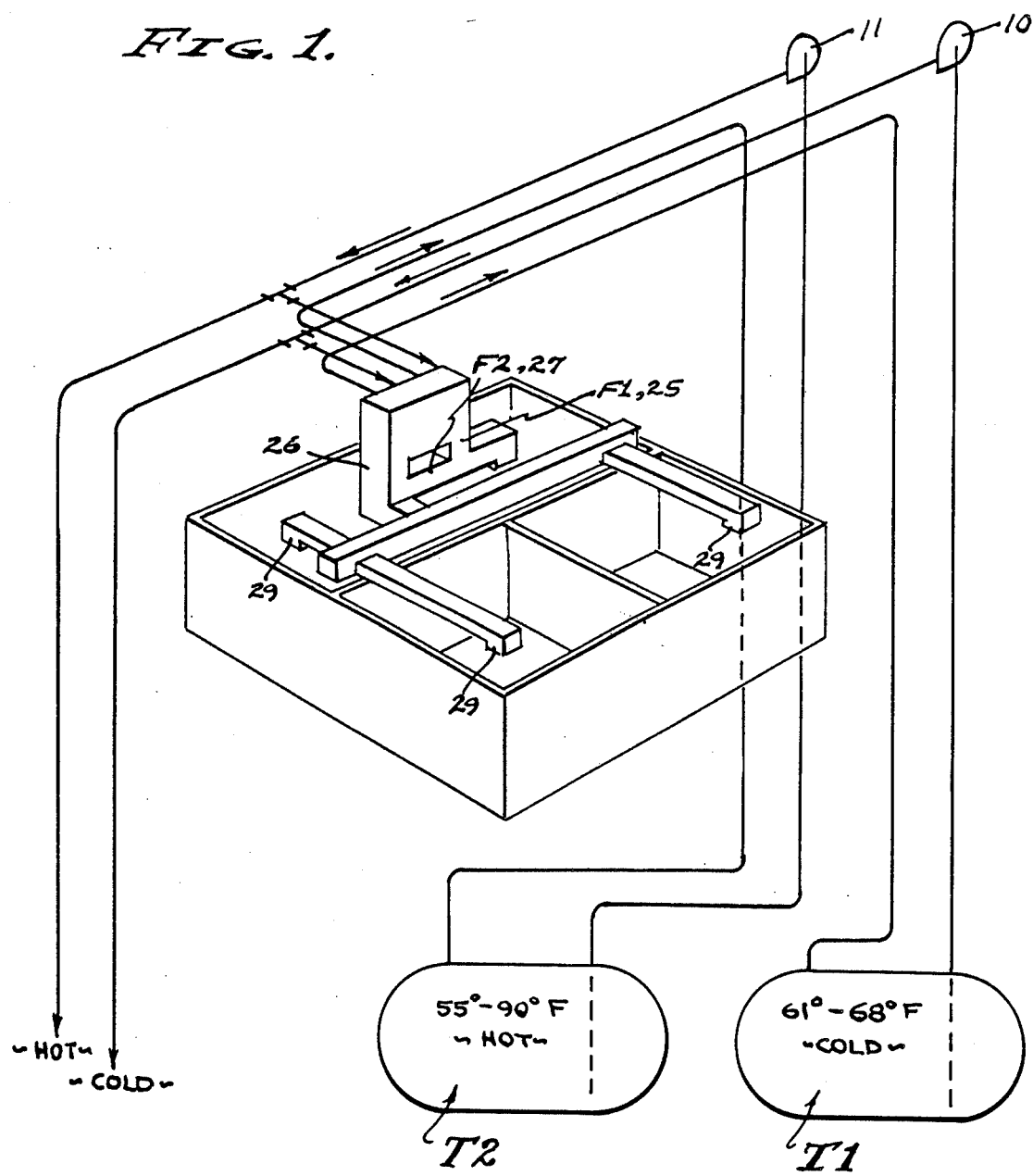
FIG. 1 is a view of one heat pump and the zone space serviced thereby, as related to the storage of both cold and hot water.

Referring now to the drawings, this is a Multi-Zone Variable Air Volume Hydronic Heat Pump System that features a mutiplicity of down-sized heat pumps P, each serving a zone space to be air conditioned. Each heat pump P operates on an individual basis to either cool or heat its associated zone space, as set by its occupants.

Any excess cooling generated by any one or more of the heat pumps P is absorbed by a charging coil C placed in the heat pump P downstream of its air handling coil A (operating as an evaporator). The charging coil C is in a closed circuit water source to a chilled water storage tank T1, it being a primary object of this invention to store excess chilled water as and when it becomes available, for subsequent use in a re-cooling coil R placed in the heat pump P upstream of its air handling coil A. The re-cooling coil R is also in the closed chilling water circuit, the chilled water from storage tank T1 being circulated by a pump 10 through either coil C or coil R.

Any excess heating or cooling generated by any one or more of the heat pumps P is also absorbed from its water coil B (operating as a condenser), a heat exchanger in a closed circuit hot water source to a hot water storage tank T2, and stored between at least 55° F. and up to 90° F. (winter 55°-summer 90°). The closed circuit hot water source includes an auxilliary hot water boiler 12 and a cooling tower 13 or the like, the hot water from storage tank T2 being circulated by a pump 11.

The chilled water source and hot water source operate independently, the chilled water source being supplied with make-up water at 15 and protected by a compression tank 16, and the hot water source being supplied with make-up water at 17 and protected by a compression tank 18.

The multiplicity of zone spaces will vary according to building requirements. For example and as shown, a three level building is serviced with a heat pump P for each separate zone space; a heat pump capacity being selected for each zone space according to its requirements. Therefore, the number of heat pumps P per building or a floor or level thereof will vary, as well as the capacity of each pump.

Figure 3:
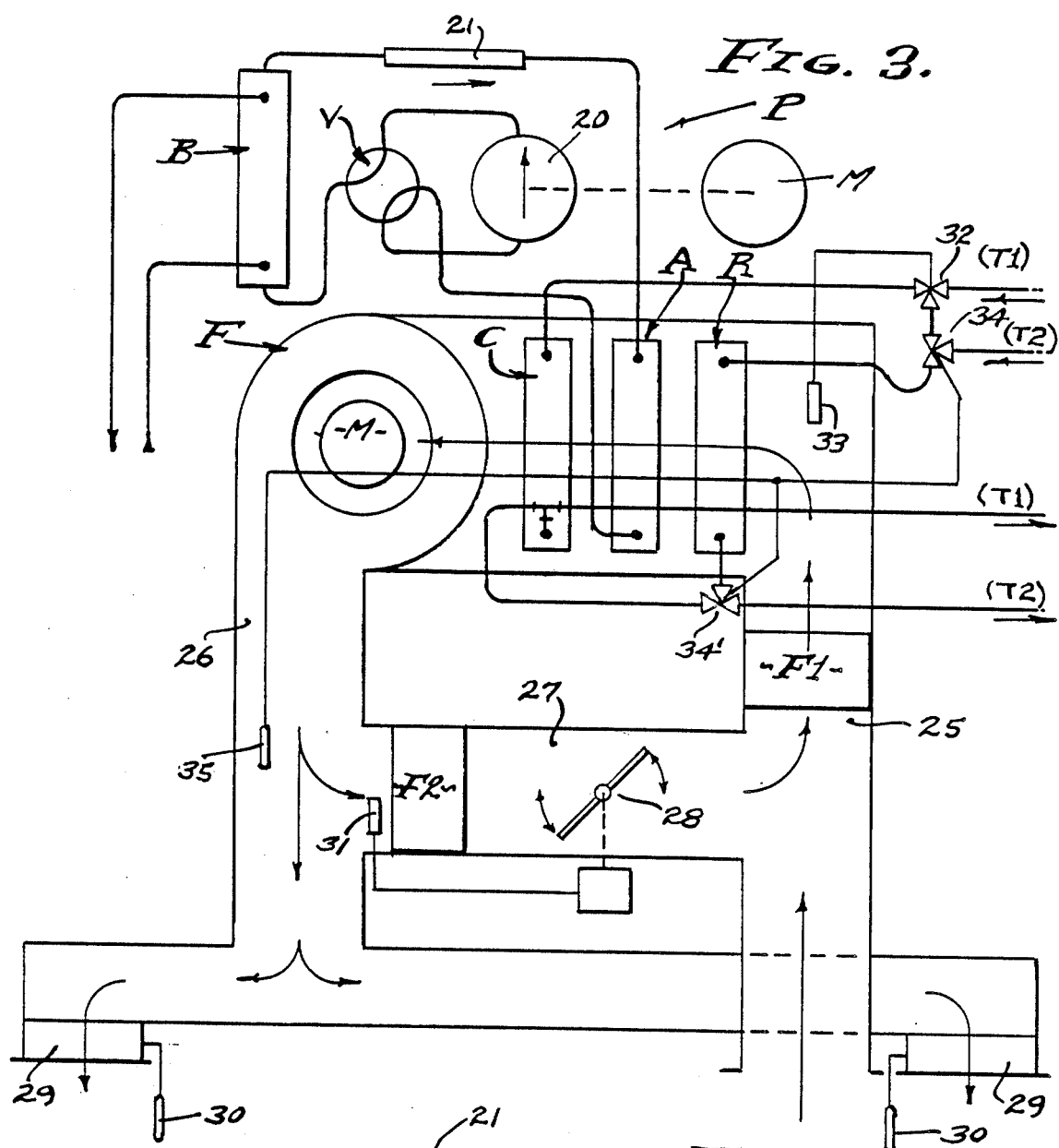
FIG. 3 is a schematic view of one of the heat pumps and its ducting into the zone space, and illustrating the charging and recooling coils that are in closed circuits with cold water storage tanks, and showing the heat pump operating in the cooling mode.

Referring now to FIG. 3 of the drawings, the heat pumps P are alike and each includes the following components and operates as follows in the cooling mode: The heat pump P is operated continuously by a motor M, and has a reversing valve V that directs the flow of hot refrigerant gas from a compressor 20 to the water coil B (condenser) to heat the water circulated through the hot water source for storage in the tank T2. Here the heat is removed by the water from the hot gas which condenses into a liquid. This liquid refrigerant is then directed through an expansion device, such as a capillary at 21, and enters the air handling coil A as a low pressure liquid. This low pressure liquid boils, becomes a vapor and absorbs heat from the supply air circulated by a blower F. The refrigerant is then returned by the valve V into the compressor, completing the cooling cycle.

Figure 4:
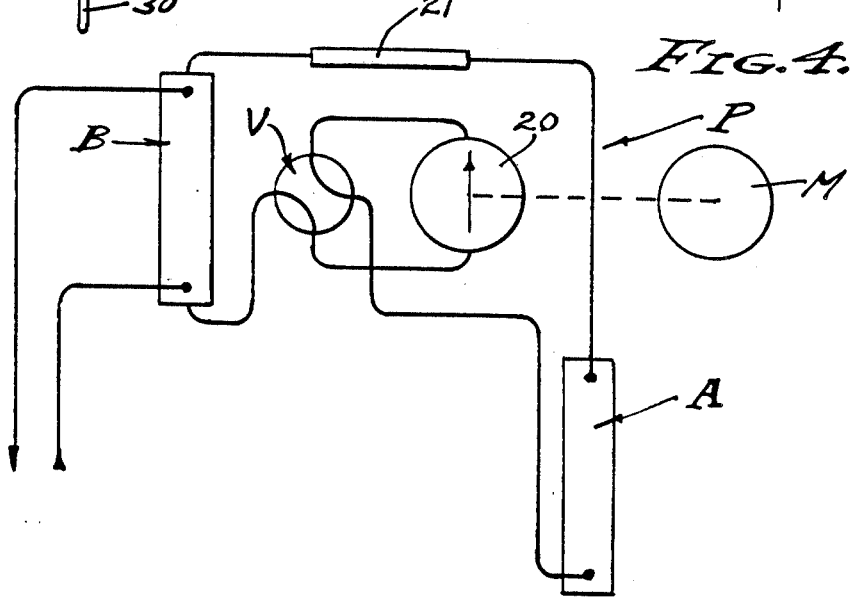
FIG. 4 is a schematic view similar to a portion of FIG. 3, showing the heat pump operating in the heating mode.

Referring now to FIG. 4 of the drawings, the heat pump P operates in the heating mode as follows: The heat pump P operates continuously by motor M, and the reversing valve V reverses the flow through coils A and B, by directing hot gas from the compressor 20 into the air handling coil A which functions as a condenser. Return air circulated by blower F is heated thereby, absorbing heat from the refrigerant as it condenses. Liquid refrigerant then flows through the expansion device 21 to the water coil B which now functions as a water chiller, as the refrigerant vaporizes and absorbs heat from the closed hot water circuit. The vaporized refrigerant is then returned by the reversing valve V into the compressor, completing the heating cycle.

Note that the water coil B heats the hot water source in the cooling mode, whereas it cools the hot water source in the heating mode. The auxilliary hot water boiler 12 and the closed circuit tower 13 compensate as required, to maintain a hot water temerature within the preferred range of 55° to 90° F.

The conditioned air circulated through the charging coil C is normally in the range of 50° to 53° F. and absorbs heat from the chilled water source pumped therethrough, so that the chilled water storage tank T1 is maintained within said useful 61°-68° F. range for precooling of mixed return and outdoor ventilation air.

In accordance with this invention, each zone space heat pump P is essentially the same, except perhaps in its capacity. That is, each has a blower F with an air intake duct 25 and an air supply duct 26. The air handling coil A is in the intake duct 25, with the charging coil C adjacent to and downstream of the coil A, and the re-cooling coil R adjacent to and upstream of the coil A. Intermediate the intake air duct 25 and supply air duct 26 there is a by-pass duct 27 in which there is a variable air volume damper means 28. The by-pass duct 27 is provided to re-circulate conditioned blower air from the supply duct 26 into the intake duct 25, proportionately as is required according to the restriction imposed by zone space dampers 29. In practice, the zone space dampers 29 may partially or completely restrict the supply air flow from the heat pump P, according to control by a space thermostat that modulates the dampers 29 between opened and closed conditions. It is to be understood that each unit heat pump P may serve one or a plurality of zones, each zone being defined for for the purposes of this invention as having its temperature controlled from a separate space theromostat 30. Accordingly, the dampers 29 are modulated by space thermostats 30, and when cooling demand is high the respective zone variable air volume dampers 29 will open, in which condition the by-pass damper means 28 modulates closed. The opening and closing of damper 28 and 29 is complementary and variable, and vise versa, as required. Therefore, a pressure responsive means 31 is provided to sense supply air pressure and to commensurately modulate the by-pass damper means 28, as stated above.

Any one space thermostat 30 interconnected with a common unit heat pump P will determine the position of unit refrigerant reversing valve, so that on a net call for heating the evaporator coil will be switched to the heating mode, and vice versa, on a net call for cooling. Zoning is arranged such that on simultaneous demands for heating and cooling, one or more space thermostats are interconnected with a single unit heat pump P serving a multiplicity of zone spaces (for example).

Also, in order to ensure a savings in fan operating energy use, pressure means 31 also causes variable speed supply means of the fan motor to increase or reduce its speed of operation depending upon net space demands for cooling and heating. In the heating mode, the recharge coil will be inoperative, but up to a pre-determined minimum the recooling coil is supplied with hot water from the hot water storage tank, as and when required.

The water source charging coil C and re-cooling coil R are temperature controlled according to the heat pump P mode of operation, cooling or heating. In the heating mode the charging coil C and re-cooling coil R are closed to water source circulation, unless re-cooling coil R is also employed for preheating as described above and the pump 11 is deactivated. However, in the cooling mode the charging coil C is opened to the storage tank T1 through valve 32 when the zone space cooling requirements are met and the closed modulation of the zone space dampers 29 causes open modulation of the by-pass damper means 28, and the re-circulation of cooled conditioned air. Thus, excess cooling is absorbed by the charging coil C and the chilled water source is cooled thereby and pumped into the chilled water storage tank T1 by pump 10. Valve 32 and pump 11 are responsive to a temperature sensor 33 in the intake duct 25, to sense the admixed and recirculated air, activating the chilled water source and the charging coil C when the intake air (whether mixed or not) is sufficiently cool or unloaded so as to permit the excess cooling capacity of the downsized compressor to be stored in tank T1 of the chilled water source.

It is to be understood that all heat pump unit compressors are controlled by the temperature in the chilled water tank T1, unless any one space thermostat 30 switches to a net demand for heating, at which time such control is automatically transferred for that unit compressor only, to the action of any one space thermostat calling for heating. All other unit compressors operate to assure that the chilled water storage tank T1 is always below a preset low temperature (I.E. 68° F.). When that low limit in the storage tank is reached, all remaining unit compressors are automatically switched to the control of their respective zone thermostats 30, in the manner hereinabove described for heating, but also respond under the circumstance of a chilled water tank at a predetermined low limit to any net space (i.e. zone) demand for cooling on a per zone basis by employing both coils A and C for charging chilled water tank T1 with available net excess cooling capacity of the continuously operating heat pump compressor.

The chilled water source is reclaimed from the the storage tank T1 by the re-cooling coil R through valves 34 and 34' when zone space cooling is not met by the heat pump P and its air handling coil A, and the opened modulation of the zone space dampers 29 causes closed modulation of the by-pass damper means 28, and the reduction or stopping of recirculated cooled conditioned air. Thus, there can be no excess cooling and on the contrary there arises a necessity to assist the downsized heat pump P. Accordingly, the valves 34—34' and pump 11 are responsive to a temperature sensor 35 in the supply air duct 26, to sense the supply air temperature when it is insufficiently cooled and requires greater heat absorption than capable of the heat pump P and its air handling coil A, and thereby activating the chilled water source and the re-cooling coil R to assist the heat pump P with the chilled water source from storage tank T1.

Referring now to air quality, in addition to the usual air filter in the return air intake duct, there is also an air filter in the air recirculation by-pass duct of the Variable-Air-Volume (VAV) system. As shown, there is a primary air filter F1 in the air intake duct 25 following the commingling therein of the recircuation air, and there is a secondary air filter F2 in the by-pass duct 27 preferably ahead of the air volume damper means 28. Said placement of the primary and secondary filters is significant, making it advantageous to place the more effective primary filter F1 for its fulltime processing of return air, while the lesser effective secondary filter F2 is of a capacity for processing the reduced volume of recycled air. In practice, the pressure sensor 31 is placed ahead of the secondary filter F2 in order to sense variable pressure in the ducts 26 and 27, to control the variable volume damper means 28.

In carrying out this invention, there is necessarily a resistance to the flow of air through duct 27 by the damper means 28, and this resistance is preceeded by the air flow resistance of the secondary filter F2, inherent in the function of its normal filtration effect. Therefore, the restrictive effect of damper means 28 is commensurately reduced at the outset, adding to improved energy efficient air filtration and recirculation to the zone space when the zone space damper 29 is modulated open. Therefore, the recycling of air on a continuous basis through the secondary filter F2 has no adverse effect upon the primary filter F1 which continues to filter the return air on demand as controlled by the zone space damper 29, and has no operating cost penalty since the available pressure differential between supply and return ducts provides the means to cause this recycled air to flow through filter F2 while said filter F2 inherently serves to restrict the air flow through duct 27. The flow restriction of filter F2 preceeds the by-pass damper means 28, and it provides a portion of the necessary flow resistance and thereby partially balances the system so that the damper means 28 then trims and/or adjusts for the filter F2 loading. It is significant that the recycled air through duct 27 and into the air supply duct 26 is repeatedly processed, or partially so, and that the quality of purification is intensified and results in super purification of the reduced air supply to the conditioned air space.

The hot water from storage tank T2 can be directly routed through a valve 37 and through the water boiler 12 for circulation by the pump 11; or said hot water from tank T2 can be indirectly routed through the indirect evaporative cooling tower 13. The valve 37 is controlled in a conventional manner by thermostat means (not shown). A feature of this invention is the cooling of the heat pump units from the evaporatively chilled water from the indirect cooling tower 13, and as shown the closed hot water circuit is directly routed through the indirect cooling tower 13 by the aforementioned valve 37. A pump 39 circulates the evaporatively chilled water when the valve 37 is open therethrough and all of which is controlled in a conventional manner by condition sensing means (not shown). When outside air is sufficiently cool, by interconnecting the tower to this closed circuit through valve 37, the heat pump units are cooled, or precooled at coil R, using indirectly chilled evaporatively cooled water, thereby directly unloading the heat pump units P when in the cooling mode.

Figure 2:
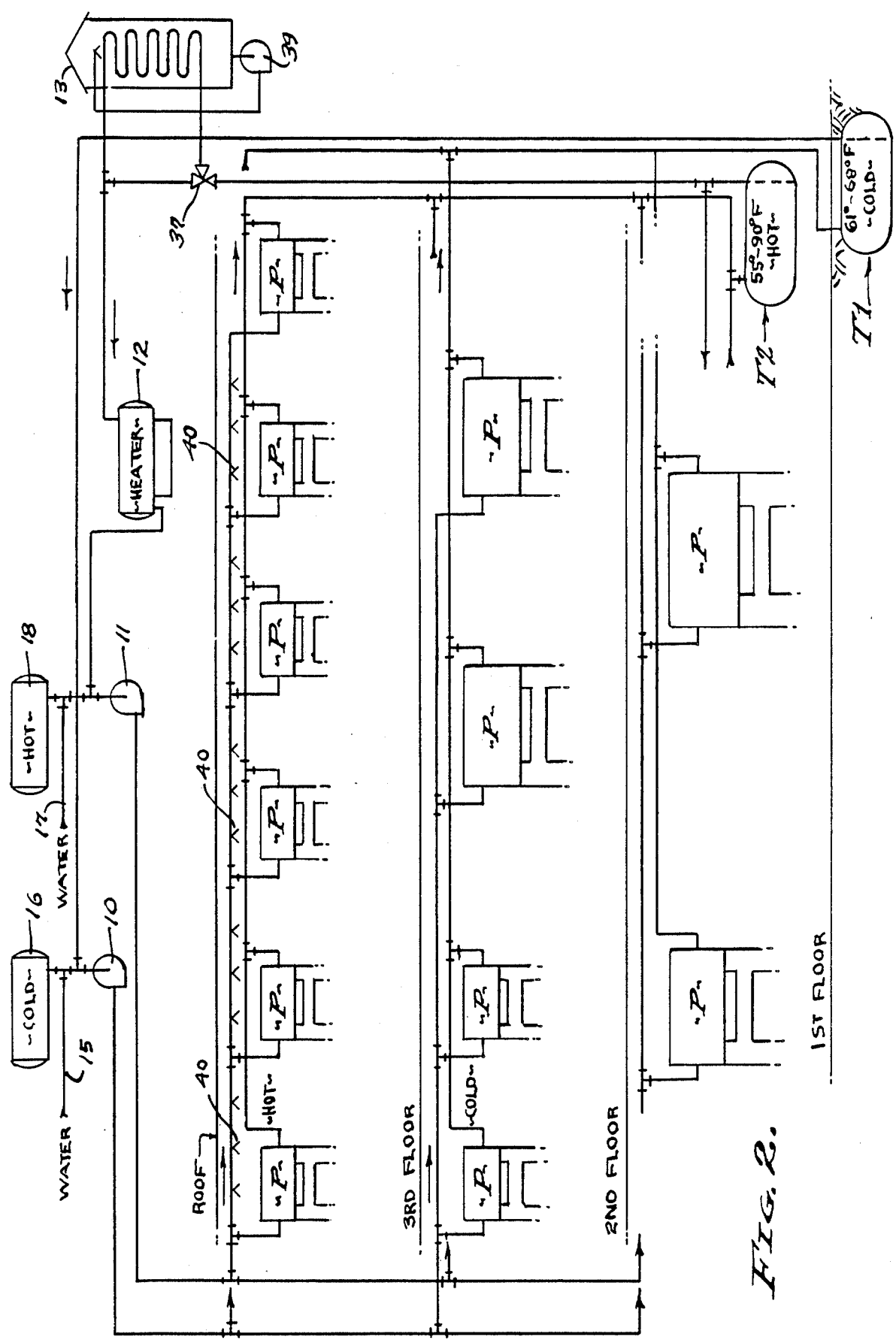
FIG. 2 is a schematic view illustrating the multi unit system as is it is comprised of dissimilar heat pump units each serving a designated zone space; a first floor with a large and a medium sized heat pump; a second floor with medium and small heat pumps; and a third floor with multiple small sized heat pumps.

From the foregoing it will be understood that I have provided a simple and direct approach and solutions to the matters of efficiency and quality of air conditioning, applied on the basis of zone space requirements and determinable periods of service. Capacity effective averaging is employed which permits the use of equipment having reduced conditining capacity, together with recycled filtration of supply air which intensifies the quality of zone space air when flow is restricted by zone space damping. This invention also makes possible the employment of heat pump units varying widely in capacity and use, and to operate them at the convenience of the occupant of separated zone spaces, while over production of either or both hot and cold water is stored for subsequent or simultaneous use in any one of the heat pump units that may require supplemental energy, whether for heating or cooling. A feature is the employment of the hot water distribution piping for fire protection sprinklers 40, as shown in FIG. 2 of the drawings.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. A multi-zone thermal energy storage variable air volume heat pump system for capacity effective averaging in and selection of a multiplicity of continuously operable heat pumps that may vary in capacity and each operable at its optimum capacity and assigned to a separate zone space, and including;

a plurality of heat pumps and each comprising a refrigerant compressor with a reversing valve directing refrigerant in alternate directions through an air conditioning coil and a water conditioning coil, an air intake duct from the assigned zone space delivering return air from the zone space and through the air conditioning coil, a supply air duct delivering conditioned air into the zone space from the air conditioning coil, and blower means driving air through said ducts, a variable air volume by-pass duct from the supply air duct to the intake air duct and with air volume damper means responsive to air pressure in the supply air duct, a zone space damper means at the discharge of the supply air duct into the zone space, a chilled water storage tank with pump means circulating the chilled water through a closed circuit, a hot water storage tank with pump means circulating the hot water through a closed circuit and through the water conditioning coil, a charging coil in the supply air duct downstream from the air conditioning coil and a re-cooling coil in the supply air duct upstream from the air conditioning coil and each selectively in closed circuit by valve means through the chilled water storage tank, and the re-cooling coil selectively in closed circuit by said valve means through the hot water storage tank, and control means responsive to duct air temperature to open said valve means from the chilled water storage tank and its closed circuit through the charging coil for chilled water storage when excess cooling is available downstream of the air conditioning coil, and alternately to open said valve means from the chilled water storage tank through its closed circuit through the re-cooling coil for cooling when return air temperature in the intake air duct is excessive.

2. The thermal energy storage hydronic heat pump system as set forth in claim 1, wherein the control means is responsive to duct air temperature to open said valve means from the hot water storage tank and through its closed circuit through the re-cooling coil for heating.

3. The thermal energy storage hydronic heat pump system as set forth in claim 1, wherein a hot water boiler is in the hot water storage tank closed circuit to maintain the required supply temperature of hot water.

4. The thermal energy storage hydronic heat pump system as set forth in claim 1, wherein a hot water boiler is in the hot water storage tank closed circuit to maintain the required supply temperature of hot water at 55° to 90° F.

5. The thermal energy storage hydronic heat pump system as set forth in claim 1, wherein the control means is responsive to chilled water storage tank temperature to maintain the required supply temperature of said chilled water.

6. The thermal energy storage hydronic heat pump system as set forth in claim 1, wherein the control means is responsive to chilled water storage tank temperature to maintain the required supply temperature of said chilled water at 50° to 68° F.

7. The thermal energy storage hydronic heat pump system as set forth in claim 1, wherein a hot water boiler is in the hot water storage tank closed circuit to maintain the required supply temperature of hot water, and wherein the control means is responsive to chilled water storage tank temperature to maintain the required supply temperature of said chilled water.

8. The thermal energy storage hydronic heat pump system as set forth in claim 1, wherein a hot water boiler is in the hot water storage tank closed circuit to maintain the required supply temperature of hot water at 55° to 90° F., and wherein the control means is responsive the chilled water storage tank temperature to maintain the required supply temperature of said chilled water at 61° to 68° F.

9. The thermal energy storage hydronic heat pump system as set forth in claim 1, wherein a cooling tower is selectively put into and out of the closed circuit of the hot water storage tank by valve means responsive to the hot water temperature for maintaining the required supply temperature of said hot water.

10. The thermal energy storage hydronic heat pump system as set forth in claim 1, wherein a cooling tower is selectively put into and out of the closed circuit of the hot water storage tank by valve means responsive to the hot water temperature for maintaining the required supply temperature of said hot water at 55° to 90° F.

11. The thermal energy storage hydronic heat pump system as set forth in claim 1, wherein a cooling tower is selectively put into and out of a closed circuit and pump means through the re-cooling coil by valve means responsive to outside air temperature for pre-cooling the heat pump intake air.

12. The thermal energy storage hydronic heat pump system as set forth in claim 1, wherein a cooling tower is selectively put into and out of the closed circuit of the hot water storage tank by valve means responsive to the hot water temperature for maintaining the required supply temperature of said hot water, and wherein a cooling tower is selectively put into and out of a closed circuit and pump means through the re-cooling coil by valve means responsive to outside air for pre-cooling the heat pump intake air.

13. The thermal energy storage hydronic heat pump system as set forth in claim 1, wherein the hot water closed circuit through the water conditioning coil is comprised of fire protection sprinkler piping.

14. The thermal energy storage hydronic heat pump system as set forth in claim 1, wherein the control means is responsive to duct air temperature to open said valve means from the hot water storage tank and through its closed circuit through the re-cooling coil for heating, wherein a hot water boiler is in the hot water storage tank closed circuit to maintain the required supply temperature of hot water at 55° to 90° F., wherein the control means is responsive to chilled water storage tank temperature to maintain the required supply temperature of said chilled water at 61° to 68° F., wherein a cooling tower is selectively put into and out of the closed circuit of the hot water storage tank by valve means responsive to the hot water temperature for maintaining the required supply temperature of said hot water at 55° to 90° F., wherein the cooling tower is selectively put into and out of a closed circuit and pump means through the re-cooling coil by valve means responsive to outside air temperature for pre-cooling the heat pump intake air, and wherein the hot water closed circuit through the water conditioning coil is comprised of fire protection sprinkler piping.

* * * * *

UNITED STATES PATENT AND TRADEMARK OFFICE
CERTIFICATE OF CORRECTION

PATENT NO. : 4,739,624
DATED : April 26, 1988
INVENTOR(S) : MILTON MECKLER

It is certified that error appears in the above—identified patent and that said Letters Patent is hereby corrected as shown below:

Col. 2 line 42 change "Initial one time filtration" to -- Filtration --; Col. 3 line 38 change "benfit" to -- benefit --; Col. 5 line 11 after "water" insert -- conditioning --; Col. 6 line 36 change "vise" to -- vice --; Col. 6, line 45, delete "," second occurrence, Col. 6, line 65 change "deactivated" to -- activated --; and Col. 7 line 6 change "11" to -- 10 --; Col. 7 line 34, delete "the" (last occurance); Col. 7 l;ine 57, change "recircuation" to -- recirculation --.

Signed and Sealed this

Seventeenth Day of January, 1989

Attest:

DONALD J. QUIGG

Attesting Officer

Commissioner of Patents and Trademarks